(12) United States Patent
Mathieson et al.

(10) Patent No.: US 11,148,718 B2
(45) Date of Patent: Oct. 19, 2021

(54) VEHICLE SEAT STRUCTURE FLEXIBILITY WITHIN SHEAR INTEGRAL STRUCTURES

(71) Applicant: GM GLOBAL TECHNOLOGY OPERATIONS LLC, Detroit, MI (US)

(72) Inventors: Eric A. Mathieson, Rochester, MI (US); Michael T. Chaney, Macomb, MI (US); Robert N. Saje, Shelby Township, MI (US); Warren J. Parsons, Oakland, MI (US); Travis W. Walker, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 143 days.

(21) Appl. No.: 16/788,866

(22) Filed: Feb. 12, 2020

(65) Prior Publication Data

US 2021/0245808 A1    Aug. 12, 2021

(51) Int. Cl.
| | | |
|---|---|---|
| *B60J 7/00* | (2006.01) | |
| *B62D 21/02* | (2006.01) | |
| *B60K 1/04* | (2019.01) | |
| *B60N 2/015* | (2006.01) | |
| *B62D 21/09* | (2006.01) | |

(52) U.S. Cl.
CPC ............. *B62D 21/02* (2013.01); *B60K 1/04* (2013.01); *B60N 2/015* (2013.01); *B62D 21/09* (2013.01); *B60K 2001/0438* (2013.01)

(58) Field of Classification Search
CPC ......... C04B 28/36; Y02E 60/10; A61K 8/416; A61Q 11/00; B60K 1/04; B60R 19/18; B60R 19/34; B60R 2019/1813; B60R 2019/182; B60R 19/24
See application file for complete search history.

(56) References Cited

U.S. PATENT DOCUMENTS

| | | | | |
|---|---|---|---|---|
| 6,561,300 | B1* | 5/2003 | Sakamoto | B60N 2/002 180/273 |
| 9,764,775 | B2* | 9/2017 | Daigaku | B62D 25/025 |
| 9,873,457 | B2* | 1/2018 | Onishi | B62D 21/157 |
| 9,873,462 | B2* | 1/2018 | Onishi | B62D 25/2036 |
| 10,427,551 | B1* | 10/2019 | Loza | B60N 2/015 |
| 2009/0217530 | A1* | 9/2009 | Tiberi | B60N 2/015 29/897.2 |
| 2010/0004897 | A1* | 1/2010 | Pfeffer | B60N 2/002 702/173 |
| 2012/0068499 | A1* | 3/2012 | Mildner | B62D 25/20 296/193.07 |

(Continued)

*Primary Examiner* — Kiran B Patel
(74) *Attorney, Agent, or Firm* — Quinn IP Law (57) ABSTRACT

A structural arrangement for a vehicle includes a body structure defining a longitudinal vehicle body axis and a lateral vehicle axis orthogonal to the longitudinal vehicle body axis. The body structure includes a lattice shear structure having a first structural member extending laterally from one side to an opposite side of the vehicle and a second structural member parallel to and longitudinally spaced apart from the first structural member, an upper shear panel extending longitudinally and laterally across the vehicle and joined to the lattice shear structure, and a seat attachment structure having a first end and a second end opposite the second end. The seat attachment structure is oriented longitudinally and is joined to both of the first and second structural members.

20 Claims, 4 Drawing Sheets

(56) References Cited

U.S. PATENT DOCUMENTS

| | | | |
|---|---|---|---|
| 2013/0320713 A1* | 12/2013 | Iwamoto | B62D 25/20 |
| | | | 296/193.07 |
| 2014/0263515 A1* | 9/2014 | Cronkright, II | B60R 11/02 |
| | | | 224/568 |
| 2017/0253209 A1* | 9/2017 | Sudo | B60R 21/04 |

* cited by examiner

VEHICLE SEAT STRUCTURE FLEXIBILITY WITHIN SHEAR INTEGRAL STRUCTURES

INTRODUCTION

The present disclosure relates generally to architectural variation flexibility for seat attachment structures to a shear vehicle architecture.

Typically, a vehicle includes a body structure for enclosing and supporting various vehicle systems, as well as the vehicle passengers. Frequently, additional structural members are used to buttress the vehicle body structure, as well as for supporting various chassis and powertrain subsystems and other components, such as underfloor energy systems.

Seat attachment structures are generally oriented laterally in a vehicle. However, this architecture directly couples the seat attachment structure to the cross-load structure and in many applications determines the placement of the body cross members of the vehicle. Thus, it is desired to enable multiple seat locations joined with a lattice shear vehicle body structure for more variant differentiation across vehicle architectures and configurations.

SUMMARY

Embodiments according to the present disclosure provide a number of advantages. For example, embodiments according to the present disclosure enable seat structure flexibility within a lattice shear vehicle body structure. The placement and configuration of the seat structure(s) are tunable based on the customer-facing attachment, such as the seat design, and for manufacturing flexibility.

In one aspect of the present disclosure, a structural arrangement for a vehicle includes a body structure defining a longitudinal vehicle body axis and a lateral vehicle axis orthogonal to the longitudinal vehicle body axis. The body structure includes a lattice shear structure having a first structural member extending laterally from one side of the vehicle to an opposite side of the vehicle and a second structural member parallel to and longitudinally spaced apart from the first structural member. The structural arrangement also includes an upper shear panel extending longitudinally and laterally across the vehicle and joined to the lattice shear structure and a seat attachment structure having a first end and a second end opposite the second end. The seat attachment structure is joined to the first and second structural members such that the first end of the seat attachment structure is joined to the first structural member and the second end of the seat attachment structure is joined to the second structural member.

In some aspects, the structural arrangement further includes a lower shear panel extending longitudinally and laterally across the vehicle parallel to the upper shear panel and joined to the lattice shear structure such that the lattice shear structure is positioned between the upper shear panel and the lower shear panel.

In some aspects, the seat attachment structure is positioned parallel to the longitudinal vehicle body axis.

In some aspects, the seat attachment structure includes a first seat attachment structure and a second seat attachment structure, and each of the first and second seat attachment structures is positioned parallel to the longitudinal vehicle body axis.

In some aspects, the first structural member has a first section width dimension and the second structural member has a second section width dimension equal to the first section width dimension, and the first structural member is separated from the second structural member by a pitch dimension.

In some aspects, the first structural member includes a first weld flange and a second weld flange connected by a first channel portion and the second structural member includes a third weld flange and a fourth weld flange connected by a second channel portion, and each of the first, second, third, and fourth weld flanges are available attachment surfaces for the seat attachment structure.

In some aspects, the lattice shear structure includes a plurality of structural members extending laterally across the vehicle, each of the plurality of structural members separated by a pitch dimension.

In some aspects, the seat attachment structure includes a plurality of seat attachment structures, each of the plurality of seat attachment structures joined to one or more of the plurality of structural members such that each of the plurality of seat attachment structures extends parallel to the longitudinal vehicle body axis.

In some aspects, the upper shear panel includes at least one edge defining an attachment opening.

In some aspects, the seat attachment structure has a first surface having a first slope and a second surface having a second slope, the first surface separated from the second surface by a longitudinal dimension of the seat attachment structure such that the first surface is forward-facing and the second surface is rear-facing.

In another aspect of the present disclosure, an automotive vehicle includes a body structure defining a longitudinal vehicle body axis and a lateral vehicle axis orthogonal to the longitudinal vehicle body axis. The body structure includes a lattice shear structure joined to the body structure and the lattice shear structure has a first structural member extending laterally from one side of the vehicle to an opposite side of the vehicle, a second structural member extending laterally from one side of the vehicle to the opposite side of the vehicle and spaced apart longitudinally from the first structural member, and an upper shear panel joined to the first and second structural members. The first structural member has a U-shaped cross-section including a first weld flange and a second weld flange connected by a channel portion defining a section width. The automotive vehicle includes a seat attachment system including a seat attachment structure joined to the first and second structural members of the lattice shear structure. The seat attachment member extends parallel to the longitudinal vehicle body axis.

In some aspects, the automotive vehicle further includes a lower shear panel extending longitudinally and laterally across the vehicle parallel to the upper shear panel and joined to the lattice shear structure such that the lattice shear structure is positioned between the upper shear panel and the lower shear panel.

In some aspects, the seat attachment structure includes a first seat attachment structure and a second seat attachment structure, and each of the first and second seat attachment structures is positioned parallel to the longitudinal vehicle body axis.

In some aspects, the first structural member has a first section width dimension and the second structural member has a second section width dimension equal to the first section width dimension, and the first structural member is separated from the second structural member by a pitch dimension.

In some aspects, the first structural member includes a first weld flange and a second weld flange connected by a first channel portion and the second structural member includes a third weld flange and a fourth weld flange connected by a second channel portion, and each of the first, second, third, and fourth weld flanges are available attachment surfaces for the seat attachment structure.

In some aspects, the seat attachment structure has a first end and a second end opposite the first end and the seat attachment structure is joined at the first end to one of the first and second weld flanges of the first structural member and at the second end to one of the third and fourth weld flanges of the second structural member.

In some aspects, the seat attachment structure has a first surface at the first end, the first surface having a first slope and a second surface at the second end, the second surface having a second slope, and the first surface is separated from the second surface by a longitudinal dimension of the seat attachment structure.

In another aspect of the present disclosure, an automotive vehicle includes a body structure defining a longitudinal vehicle body axis and a lateral vehicle axis orthogonal to the longitudinal vehicle body axis. The body structure includes a lattice shear structure joined to the body structure and has a first structural member extending laterally from one side of the vehicle to an opposite side of the vehicle, a second structural member extending laterally from one side of the vehicle to the opposite side of the vehicle and spaced apart longitudinally from the first structural member, an upper shear panel joined to the first and second structural members, and a lower shear panel joined to the first and second structural members and extending longitudinally and laterally across the vehicle parallel to the upper shear panel such that the first and second structural members are positioned between the upper shear panel and the lower shear panel. The automotive vehicle includes a seat attachment system including a seat attachment structure joined to the first and second structural members of the lattice shear structure, the seat attachment member extending parallel to the longitudinal vehicle body axis and an underfloor energy storage system joined to the lower shear panel.

In some aspects, the first structural member has a U-shaped cross-section including a first weld flange and a second weld flange connected by a channel portion defining a section width, the second structural member has a U-shaped cross-section including a third weld flange and a fourth weld flange connected by a second channel portion, and each of the first, second, third, and fourth weld flanges are available attachment surfaces for the seat attachment structure.

In some aspects, the seat attachment structure has a first end and a second end opposite the first end and the seat attachment structure is joined at the first end to one of the first and second weld flanges of the first structural member and at the second end to one of the third and fourth weld flanges of the second structural member.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Vehicle body structures often include body cross members to distribute side impact loads across the vehicle. Typically, lateral seat attachment structures are joined to the body cross members to attach vehicle seats to the underlying vehicle structure. As discussed herein, use of a lattice shear vehicle structure including a plurality of cross members arranged within the lattice enables modular attachment of longitudinal seat attachment structures that can be modified based on the vehicle seat configuration, etc. In various embodiments, the arrangement of the cross members within the lattice shear structure, based on section size and pitch, provides multiple opportunities to position seat structures longitudinally. Longitudinal seat attachment structures such as the embodiments shown herein, including seat attachment structures of varying lengths, shapes, widths, etc., in combination with the section size and pitch of the underlying lattice shear structure (discussed in greater detail with respect to FIGS. 6 and 7), enable greater flexibility in seat structure placement than traditional systems in which the desired seat location determines the location of the underlying cross member structures. The placement of the seat attachment structures spanning multiple structural members decouples the seat location from the underlying lattice shear structure of the vehicle.

Figure 1:
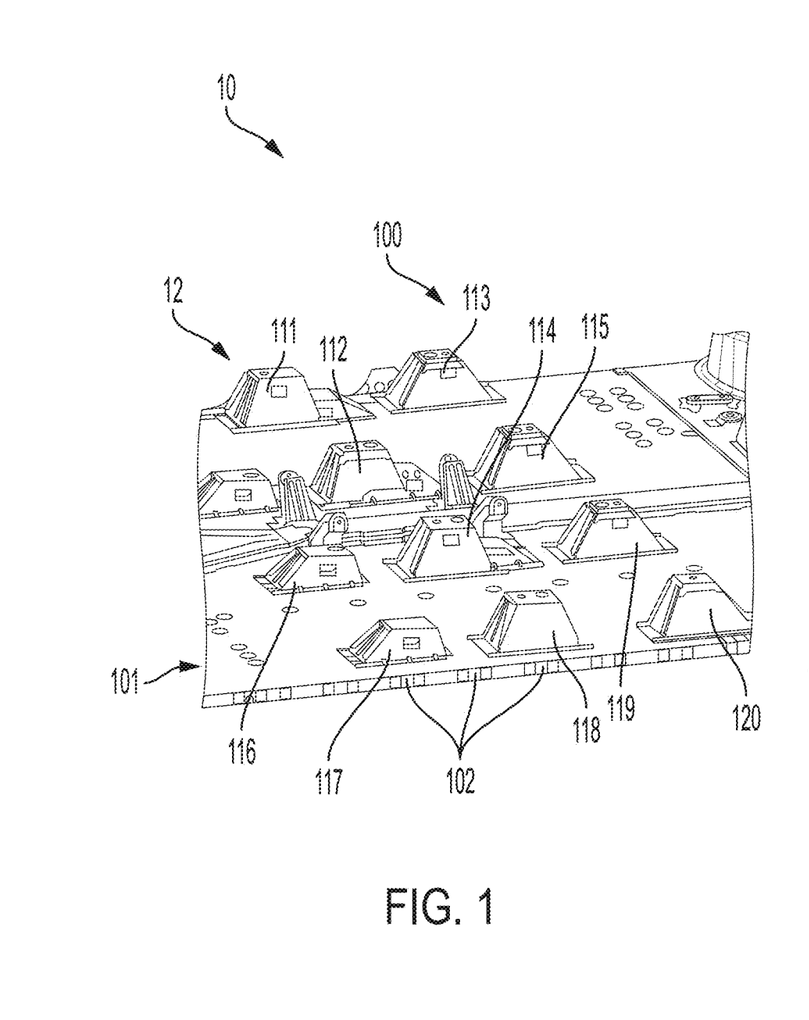
FIG. 1 is a schematic partial perspective view of a longitudinal seat structure for a vehicle, according to an embodiment.
Figure 2:
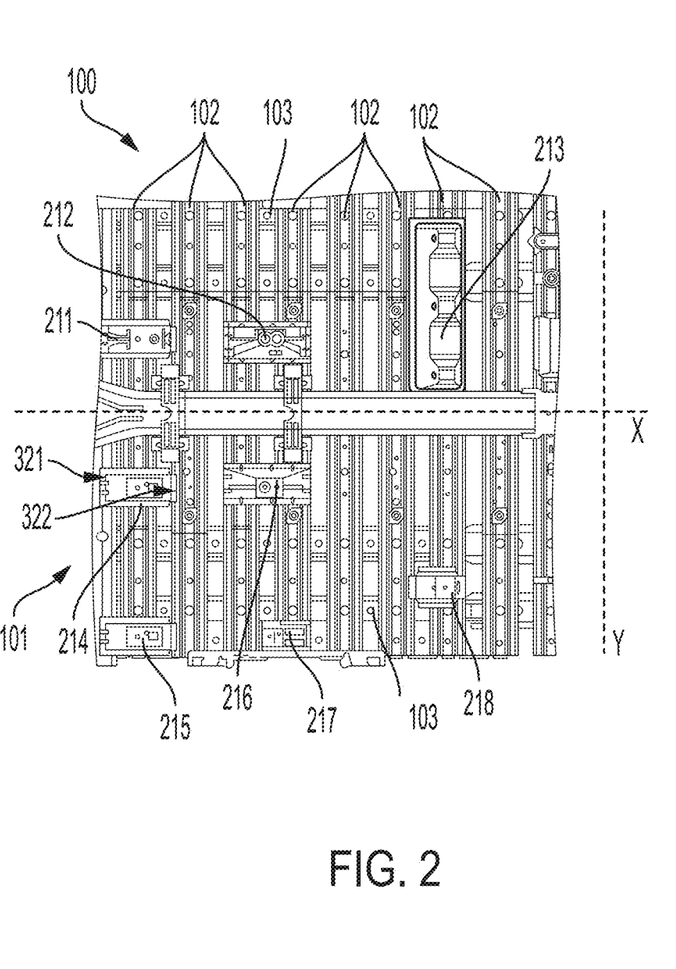
FIG. 2 is a schematic partial top view of a longitudinal seat structure for a vehicle, according to an embodiment.
Figure 3:
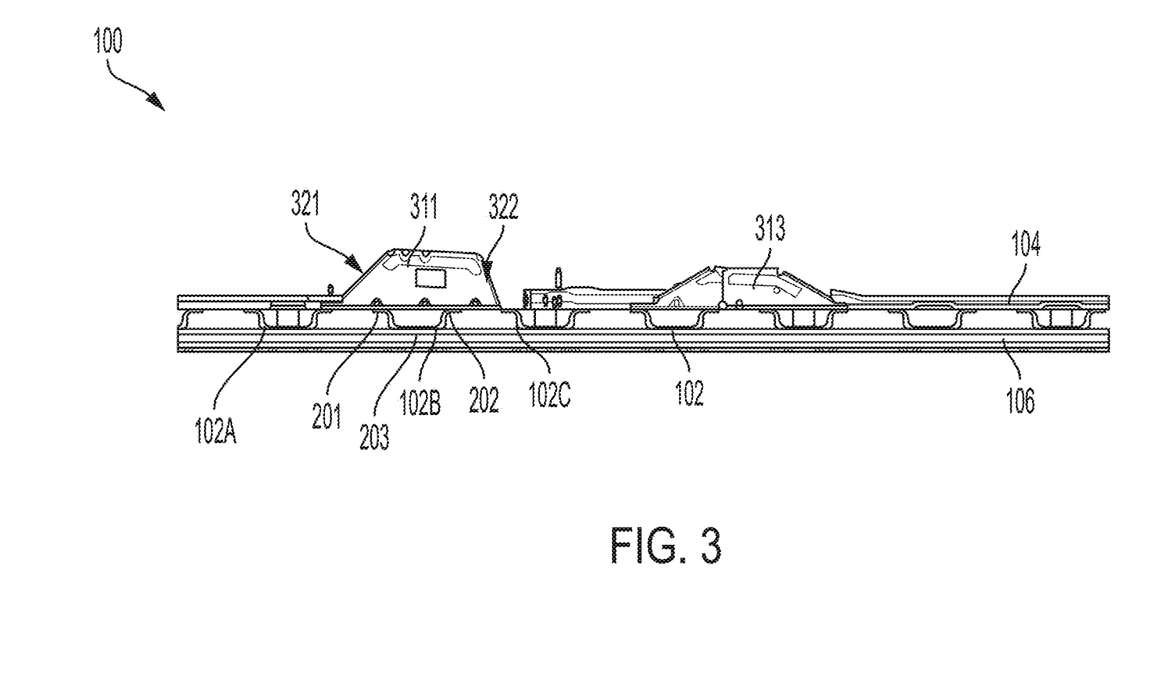
FIG. 3 is schematic side view of a longitudinal seat structure and lattice shear structure for a vehicle, according to an embodiment.

FIGS. 1-3 illustrate a vehicle 10 having a vehicle body structure 12. The vehicle body structure 12 is made up of a vehicle body constructed from a number of components, such as exterior body panels (not shown), sub-structures, and a lattice shear structure 101. The vehicle body structure 12 is characterized by a longitudinal vehicle centerline or vehicle body axis that generally coincides with an X-axis and is orthogonal to a lateral vehicle axis (Y-axis).

The lattice shear structure 101 includes a plurality of structural members 102 that extend laterally from one side of the vehicle 10 to the other and a plurality of longitudinal members 103 that extend parallel to the longitudinal vehicle body axis. In various embodiments, the structural members 102 are approximately evenly spaced along the vehicle body axis, as best shown in FIGS. 2 and 3. However, in various embodiments, the placement and spacing between the structural members 102 depends on one or more factors such as vehicle configuration, size, packaging and placement of other vehicle components such as, for example, underfloor energy system attachment components, and manufacturing considerations such as weld and/or fastener placement locations, etc., as discussed in greater detail herein.

In various embodiments, the lattice shear structure 101 includes an upper shear panel 104 and a lower shear panel 106. The upper shear panel 104 is supported by a lattice composed of the lateral structural members 102 along with the longitudinal members 103, as shown in FIG. 2. In various embodiments, the upper shear panel 104 and the underlying lattice of structural members 102 form a floor structure of the vehicle. In various embodiments, the structural members 102 are sandwiched between, and joined to, the upper shear panel 104 and the lower shear panel 106 of the vehicle body structure 12. The lattice of structural members 102 between the upper and lower shear panels 104, 106 acts as a shear panel stabilization system. In various embodiments, the lattice shear structure 101 includes an upper shear panel 104 and does not include a lower shear panel 106.

As shown in FIG. 3, in various embodiments, each structural member 102 is a U-shaped channel member (three are called out as 102A, 102B, 102C). Each structural member 102 has a first weld flange 201 and a second weld flange 202. A dimension of each of the weld flanges 201, 202 is driven by the components attached to the structural members, such as the seat attachment structures and, in various embodiments, an underfloor energy storage system, as discussed in greater detail herein. A channel portion 203 connects the first weld flange 201 and the second weld flange 202. In various embodiments, the first weld flange 201 and the second weld flange 202 of each structural member 102 are joined to the upper shear panel 104 via any coupling means such as, for example and without limitation, welding or mechanical fasteners. The channel portion 203 of each structural member 102 is joined to the lower shear panel 106 via any coupling means such as, for example and without limitation, welding or mechanical fasteners.

The size and spacing of the structural members 102 of the lattice shear structure 101 enables manufacture of the vehicle 10 using individual compartments that are configured to be small and manageable for manufacturing flexibility. Various vehicle configurations are divided into compartments for vehicle configuration flexibility. The compartments are joined using welds or mechanical fasteners. The size and spacing of the structural members 102 is adjustable to accommodate access openings for the welds and mechanical fasteners used to join the compartments together, as well as to join the seat attachment structures to the lattice shear structure 101.

Figure 4:
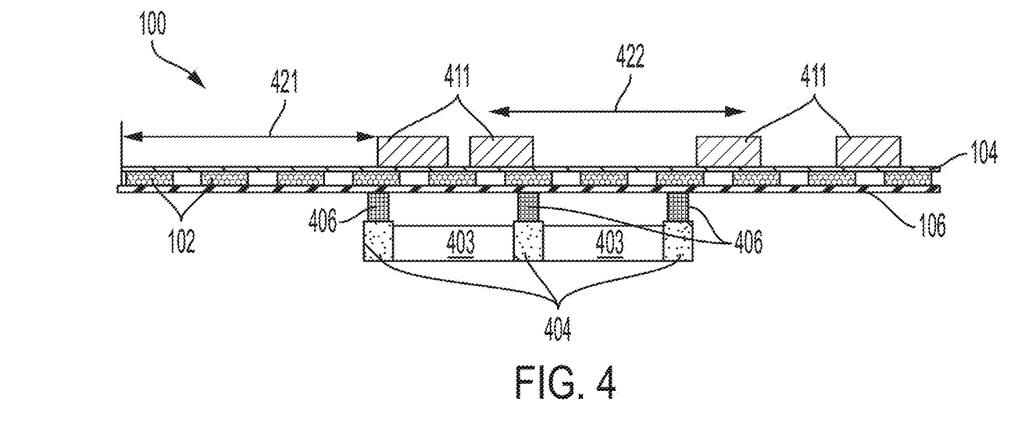
FIG. 4 is a schematic side view of a longitudinal seat structure and lattice shear structure for a vehicle, according to another embodiment.
Figure 5:
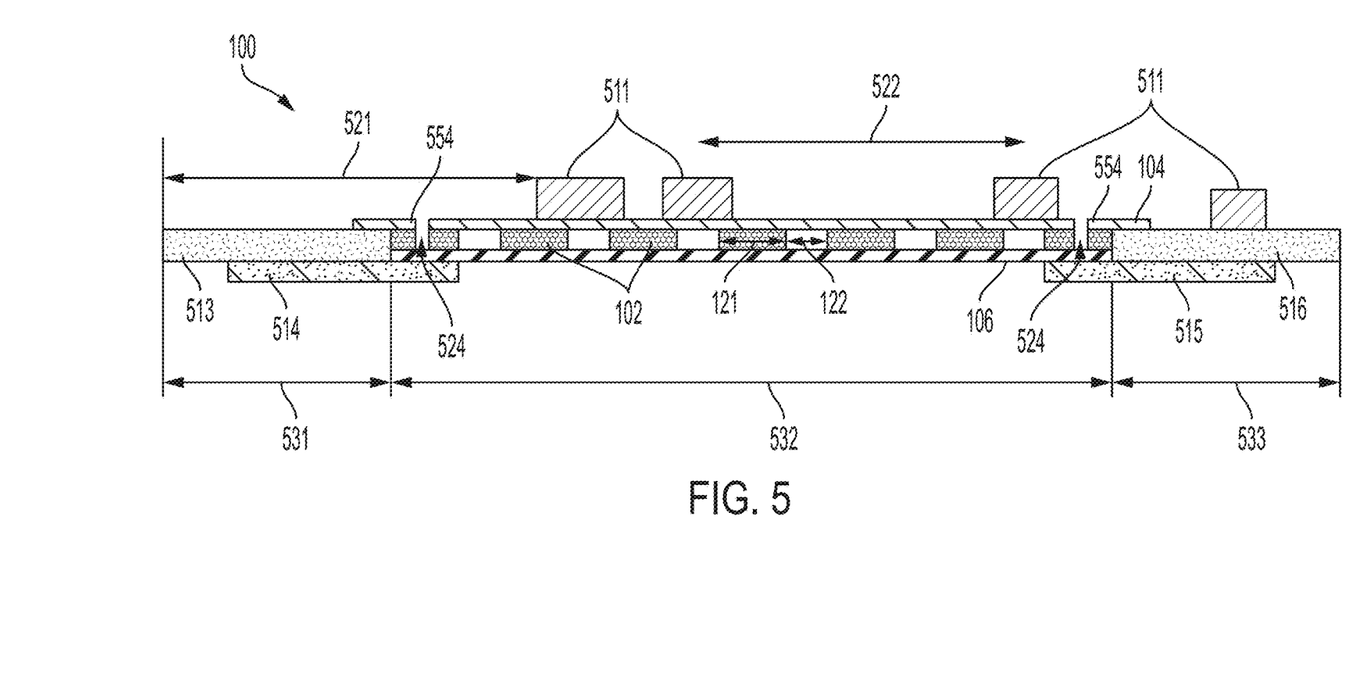
FIG. 5 is a schematic side view of a longitudinal seat structure and lattice shear structure for a vehicle, according to another embodiment.

With reference to FIGS. 4 and 5, in some embodiments, an underfloor energy system 403 is joined to the lower shear panel 106 via an underfloor energy system structure 404 via one or more attachment points 406. In various embodiments, each attachment point 406 is aligned with a structural member 102 such that the underfloor energy system structure 404 is joined to multiple structural members 102 of the lattice shear structure 101.

With reference to FIG. 5, a longitudinal width or dimension 121 of each of the structural members 102, as well as a structural member spacing 122 between the structural members 102 is configurable based on the vehicle type, configuration, seat placement, underfloor energy system placement, etc., among other factors. Various vehicle configurations are divided into compartments for vehicle configuration flexibility, such as the first compartment 531, the second compartment 532, and the third compartment 533. In some embodiments, the second compartment 532 includes the lattice shear structure 101 while the first and third compartments 531, 533 include other vehicle structures appropriate for the forward and rearward sections of the vehicle 10. A forward reinforcement member 514 couples a forward vehicle structure 513 to the lower shear panel 106 of the lattice shear structure 101. Similarly, a rear reinforcement member 515 couples a rear vehicle structure 516 to the lower shear panel 106 of the lattice shear structure 101. The forward and rear reinforcement members 514, 515 are designed to span the joints between the compartments and are welded to reinforce the compartment splits. In various embodiments, additional local reinforcements are added via mechanical fasteners or other fastening means to reinforce the compartment joints for improved continuity. In various embodiments, a first seat dimension 521 is defined between the dash and the front seat attachments 511 and a second seat dimension 522 is defined between the front seat attachments 511 and the rear seat attachments 511.

In various embodiments, the upper shear panel 104 includes a plurality of edges 554 defining a plurality of attachment openings 524. The attachment openings 524 enable access to the lower shear panel 106 to join the multiple compartments and attach other vehicle components, such as the underfloor energy system module 403, via welding or other fastening means, such as mechanical fasteners. The spacing of the structural members 102 of the lattice shear structure 101 enables placement of the attachment openings 524 throughout the second compartment 532 for configurable attachment of other vehicle components and manufacturing accessibility around the configurable seat attachment structures 511.

Figure 6:
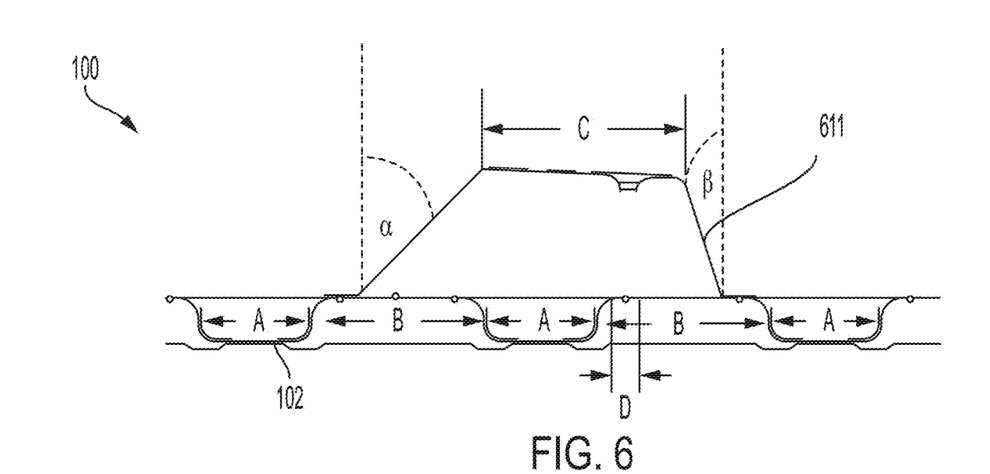
FIG. 6 is a schematic side view of a longitudinal seat structure and lattice shear structure, according to another embodiment.
Figure 7:
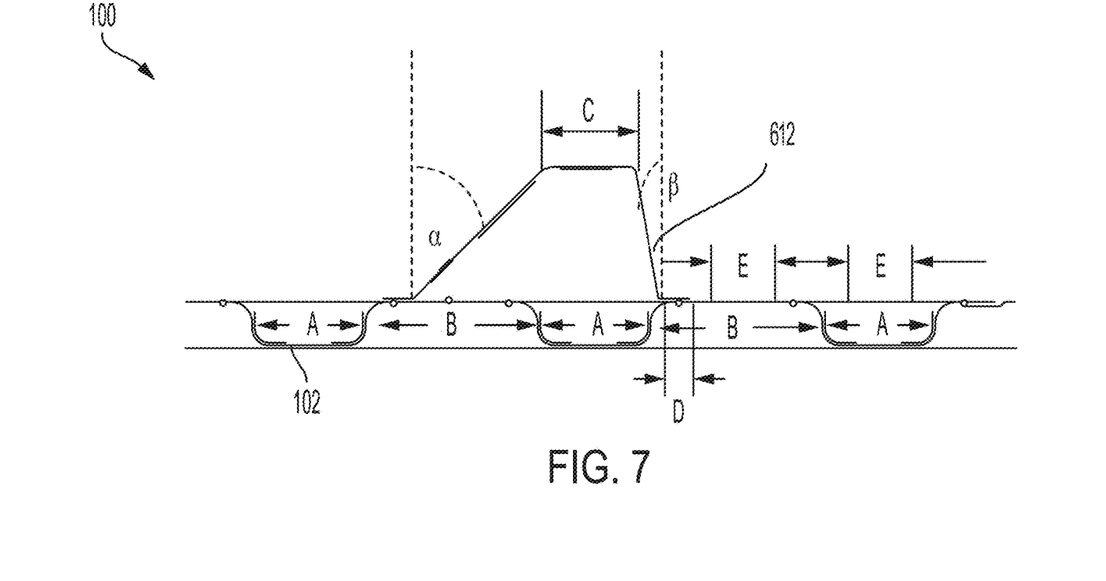
FIG. 7 is a schematic side view of a longitudinal seat structure and lattice shear structure, according to another embodiment.

In various embodiments, the desired seat location and spacing, underfloor energy system attachment location(s), desired compartment break location(s), etc. are used to generate an optimized structural member 102 width and pitch or spacing within the lattice shear structure 101. FIGS. 6 and 7 illustrate schematic side views of two configurations of a seat attachment structure joined to the lattice shear structure 101. With reference to FIG. 6, each structural member 102 of the lattice shear structure 101 has a section width designated as A and a pitch dimension between the members 102 designated as B. A weld flange of each of the structural members 102 has a dimension designed as D. The dimension D is configured for placement of weld access openings for component attachment, such as the underfloor energy system structure 404 referenced in FIGS. 4 and 5 and for the seat attachment structures discussed herein. A seat attachment structure 611 includes a longitudinal dimension C, a front face angle α (alpha), and a rear face angle β (beta). Each dimension and angle of the seat attachment structure 611 is determined from the customer-facing component requirement (such as seat type and placement within the vehicle 10), for example and without limitation. The embodiment shown in FIG. 6 includes the seat attachment structure 611 joined to the lattice shear structure 101 without compartment breaks.

Another embodiment of a seat attachment structure 612 is shown in FIG. 7. In this embodiment, each structural member 102 of the lattice shear structure 101 has a section width designated as A and a pitch dimension between the members 102 designated as B. A weld flange of each of the structural members 102 has a dimension designed as D. The dimension D is configured for placement of weld access openings for component attachment, such as the underfloor energy system structure 404 referenced in FIGS. 4 and 5 and for the seat attachment structures discussed herein. Additional space between the structural members 102 is designated as E. The spacing E illustrates one example of a spacing between structural members 102 due to a compartment break. The compartment breaks introduce additional complexity in the placement of the seat attachment structures and the weld access openings. The seat attachment structure 612 includes a longitudinal dimension C, a front face angle α (alpha), and a rear face angle β (beta), and as with the seat attachment structure 611, each dimension and angle of the seat attachment structure 612 is determined by manufacturing considerations such as the placement of weld access openings and seat type and placement requirements.

The use of the seat attachment structures discussed herein along with the lattice shear structure 101 enable a configurable seat attachment system 100 with components that can be moved longitudinally and laterally to accommodate the attachment structures of the customer-facing components, such as the seats, as well as underbody components such as underfloor energy systems and the weld access openings used to attach the underbody components and other components to the vehicle body structure 12.

With reference again to FIGS. 1-3, the vehicle body structure 12 also includes a configurable seat attachment system 100 including plurality of seat attachment structures joined to the lattice shear structure 101 of the vehicle 10, according to an embodiment. With continued reference to FIGS. 1-3, a plurality of seat attachment structures 111-120, 211-218, 311 are joined to one or more structural members 102 of the lattice shear structure 101. Each of the seat attachment structures 111-120, 211-218, 311 shown in FIGS. 1-3 illustrate examples of different sizes and shapes of seat attachment structures. For example, with reference to FIG. 3, a forward-facing surface of the seat attachment structure, such as the first surface 321 of the seat attachment structure 311, can have a first slope while a rear-facing surface, such as the second surface 322, has a second slope different from the first slope. The shape and dimensions of each of the seat attachment structures 111-120, 211-218, 311 is configurable to allow the seat attachment structures to be positioned anywhere along the lattice shear structure 101 of the vehicle 10.

In various embodiments, the seat attachment structures are oriented longitudinally, as shown by the seat attachment structures 111-120, 211, 212, 214-218, and 311. The longitudinally arranged seat attachment structures are joined to one or more of the structural members 102. As shown in FIG. 2, the seat attachment structure 214 is joined at a first end 321 to a first structural member 102 and at a second end 322 to a second structural member 102. In various embodiments, the seat attachment structure longitudinally spans one, two, three, or more structural members 102. With continued reference to FIG. 2, in some embodiments, a seat attachment structure such as the seat attachment structure 213, extends laterally but is joined to one or more structural members 102 longitudinally.

Several examples of seat attachment structures are shown in FIGS. 1-3. In various embodiments, the configuration of the seat attachment structure is based on the type of seat to be attached (single passenger seat, bench, etc.), the location of the seat (front row, middle row, back row, etc.), and the number of total seat attachment structures needed for a given seat configuration. For example, a driver's seat may have four separate seat attachment structures, such as the seat attachment structures 214-217, with each seat attachment structure 214-217 joined longitudinally to one or more structural members 102. Each of the seat attachment structures 111-120, 211-218, 311 is configured to work with the attached customer-facing components, such as the seat, bench, etc. and also enable a desired seat to seat couple distance.

As shown in FIGS. 4 and 5, the seat attachment structures 411, 511 are joined to the underlying lattice structure 101 in a modular configuration. Each seat attachment structure 411, 511 is joined to one or more structural members 102. In the illustrated embodiment, the structural members 102 are sandwiched between, and joined to, an upper shear panel 104 and a lower shear panel 106. With reference to FIG. 4, a first spacing 421 defines a longitudinal dashboard to front seat dimension and a second spacing 422 defines a longitudinal seat to seat dimension, such as, for example, the spacing between the front seat or bench and a second row or back seat or bench. In various embodiments, the seat attachment structures 411 can be adjusted forward and rearward depending on the desired first and second spacings 421, 422, the desired seat configuration and type, the underlying position of the structural members 102, among other factors.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," ",", and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, hut may be approximated and/or larger or smaller, as desired, reflecting acceptable tolerances, conversion factors, rounding off, measurement error and the like and other factors known to those of skill in the art. The term. "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term. "alternatively" refers to selection of one of two or more alternatives and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A structural arrangement for a vehicle, comprising:
a body structure defining a longitudinal vehicle body axis and a lateral vehicle axis orthogonal to the longitudinal vehicle body axis, the body structure including a lattice shear structure having a first structural member extending laterally from one side of the vehicle to an opposite side of the vehicle and a second structural member parallel to and longitudinally spaced apart from the first structural member;
an upper shear panel extending longitudinally and laterally across the vehicle and joined to the lattice shear structure; and
a seat attachment structure having a first end and a second end opposite the first end, the seat attachment structure joined to the first and second structural members such that the first end of the seat attachment structure is joined to the first structural member and the second end of the seat attachment structure is joined to the second structural member.

2. The structural arrangement for the vehicle of claim 1 further comprising a lower shear panel extending longitudinally and laterally across the vehicle parallel to the upper shear panel and joined to the lattice shear structure such that the lattice shear structure is positioned between the upper shear panel and the lower shear panel.

3. The structural arrangement for the vehicle of claim 1, wherein the seat attachment structure is positioned parallel to the longitudinal vehicle body axis.

4. The structural arrangement for the vehicle of claim 1, wherein the seat attachment structure includes a first seat attachment structure and a second seat attachment structure, and each of the first and second seat attachment structures is positioned parallel to the longitudinal vehicle body axis.

5. The structural arrangement for the vehicle of claim 1, wherein the first structural member has a first section width dimension and the second structural member has a second section width dimension equal to the first section width dimension, and the first structural member is separated from the second structural member by a pitch dimension.

6. The structural arrangement for the vehicle of claim 1, wherein the first structural member includes a first weld flange and a second weld flange connected by a first channel portion and the second structural member includes a third weld flange and a fourth weld flange connected by a second channel portion, and each of the first, second, third, and fourth weld flanges are available attachment surfaces for the seat attachment structure.

7. The structural arrangement for the vehicle of claim 1, wherein the lattice shear structure includes a plurality of structural members extending laterally across the vehicle, each of the plurality of structural members separated by a pitch dimension.

8. The structural arrangement for the vehicle of claim 7, wherein the seat attachment structure includes a plurality of seat attachment structures, each of the plurality of seat attachment structures joined to one or more of the plurality of structural members such that each of the plurality of seat attachment structures extends parallel to the longitudinal vehicle body axis.

9. The structural arrangement for the vehicle of claim 1, wherein the upper shear panel includes at least one edge defining an attachment opening.

10. The structural arrangement for the vehicle of claim 1, wherein the seat attachment structure has a first surface having a first slope and a second surface having a second slope, the first surface separated from the second surface by a longitudinal dimension of the seat attachment structure such that the first surface is forward-facing and the second surface is rear-facing.

11. An automotive vehicle, comprising:
a body structure defining a longitudinal vehicle body axis and a lateral vehicle axis orthogonal to the longitudinal vehicle body axis, the body structure including a lattice shear structure joined to the body structure and having a first structural member extending laterally from one side of the vehicle to an opposite side of the vehicle, a second structural member extending laterally from one side of the vehicle to the opposite side of the vehicle and spaced apart longitudinally from the first structural member, and an upper shear panel joined to the first and second structural members, the first structural member having a U-shaped cross-section including a first weld flange and a second weld flange connected by a channel portion defining a section width; and
a seat attachment system including a seat attachment structure joined to the first and second structural members of the lattice shear structure, the seat attachment structure extending parallel to the longitudinal vehicle body axis.

12. The automotive vehicle of claim 11 further comprising a lower shear panel extending longitudinally and laterally across the vehicle parallel to the upper shear panel and joined to the lattice shear structure such that the lattice shear structure is positioned between the upper shear panel and the lower shear panel.

13. The automotive vehicle of claim 11, wherein the seat attachment structure includes a first seat attachment structure and a second seat attachment structure, and each of the first and second seat attachment structures is positioned parallel to the longitudinal vehicle body axis.

14. The automotive vehicle of claim 11, wherein the first structural member has a first section width dimension and the second structural member has a second section width dimension equal to the first section width dimension, and the first structural member is separated from the second structural member by a pitch dimension.

15. The automotive vehicle of claim 11, wherein the first structural member includes a first weld flange and a second weld flange connected by a first channel portion and the second structural member includes a third weld flange and a fourth weld flange connected by a second channel portion, and each of the first, second, third, and fourth weld flanges are available attachment surfaces for the seat attachment structure.

16. The automotive vehicle of claim 11, wherein the seat attachment structure has a first end and a second end opposite the first end and the seat attachment structure is joined at the first end to one of the first and second weld flanges of the first structural member and at the second end to one of the third and fourth weld flanges of the second structural member.

17. The automotive vehicle of claim 16, wherein the seat attachment structure has a first surface at the first end, the first surface having a first slope and a second surface at the second end, the second surface having a second slope, and the first surface is separated from the second surface by a longitudinal dimension of the seat attachment structure.

18. An automotive vehicle, comprising:
a body structure defining a longitudinal vehicle body axis and a lateral vehicle axis orthogonal to the longitudinal vehicle body axis, the body structure including a lattice shear structure joined to the body structure and having a first structural member extending laterally from one side of the vehicle to an opposite side of the vehicle, a second structural member extending laterally from one side of the vehicle to the opposite side of the vehicle and spaced apart longitudinally from the first structural member, an upper shear panel joined to the first and second structural members, and a lower shear panel joined to the first and second structural members and extending longitudinally and laterally across the vehicle parallel to the upper shear panel such that the first and second structural members are positioned between the upper shear panel and the lower shear panel;
a seat attachment system including a seat attachment structure joined to the first and second structural members of the lattice shear structure, the seat attachment structure extending parallel to the longitudinal vehicle body axis; and
an underfloor energy storage system joined to the lower shear panel.

19. The automotive vehicle of claim 18, wherein the first structural member has a U-shaped cross-section including a first weld flange and a second weld flange connected by a channel portion defining a section width, the second structural member has a U-shaped cross-section including a third weld flange and a fourth weld flange connected by a second channel portion, and each of the first, second, third, and fourth weld flanges are available attachment surfaces for the seat attachment structure.

20. The automotive vehicle of claim 19, wherein the seat attachment structure has a first end and a second end opposite the first end and the seat attachment structure is joined at the first end to one of the first and second weld flanges of the first structural member and at the second end to one of the third and fourth weld flanges of the second structural member.

* * * * *